Patented Feb. 2, 1954

2,668,180

UNITED STATES PATENT OFFICE 2,668,180

PREPARATION OF ARYLDIALKYL PEROXIDES

Harold Boardman, Wilmington, Del., assignor to Hercules Powder Company, Wilmington, Del., a corporation of Delaware No Drawing. Application July 1, 1950, Serial No. 171,745

11 Claims. (Cl. 260—610)

This invention relates to the condensation of hydroperoxides and more particularly α-arylalkyl hydroperoxides with α-aryl tertiary alcohols and to the peroxides so produced.

The reaction between aliphatic tertiary alcohols and alkyl hydroperoxides for the production of unsymmetrical peroxides is known. The condensation involved requires that the reaction be carried out in the presence of at least sufficient concentrated aqueous acid solutions to act as a solvent for the aliphatic tertiary alcohols or, in the case of sulfuric acid, the tertiary alcohol itself may be combined as a sulfuric acid ester, and that ester may be one produced by dissolving the corresponding olefin in concentrated aqueous sulfuric acid. Only in the presence of strong acids can these alcohols thus be condensed with alkyl hydroperoxides. But in the presence of the required concentration of acid catalyst, α-arylalkyl hydroperoxides, such as α,α-dialkyl-α-arylmethyl hydroperoxides, are incapable of undergoing reaction to form peroxides because hydroperoxides of this type decompose into phenolic compounds in the presence of the strong acid solvent. Thus, it is not possible, even by modifying the catalyst concentration, to produce α-arylalkyl t-alkyl peroxides by condensation of an α-arylalkyl hydroperoxide with a tertiary aliphatic alcohol, nor is it possible to produce bis(α-arylalkyl) peroxides by condensing the corresponding alcohol and hydroperoxide in the manner used in the prior art for aliphatic peroxides.

Now in accordance with the present invention, it has been found that α-arylalkyl peroxides of the formula

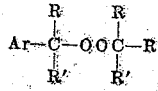

wherein Ar is an aryl radical, R is an aliphatic radical, and R' is either an aliphatic or an aryl radical can be produced by reacting a hydroperoxide of the formula

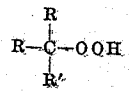

with up to but not exceeding a two-mole excess of an alcohol of the formula

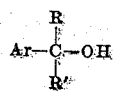

at 50–120° C. in the presence of a catalytic amount up to 0.5% of an acid-acting condensation catalyst based on the weight of the alcohol.

While the present invention provides a process by which, for the first time, it has been possible to condense α,α-dialkyl-α-arylmethyl hydroperoxides with α-aralkyl alcohols, the process is also applicable for the condensation of aliphatic tertiary hydroperoxides with α-aralkyl alcohols which are more susceptible to dehydration in strong acid solutions of the prior art.

The following examples constitute specific illustrations of the manner in which these novel α-arylalkyl peroxides may be produced. All parts are parts by weight.

Example I

To 150,000 parts α,α-dimethylbenzyl alcohol, free of acetophenone, was added 8 parts p-toluenesulfonic acid. When dissolution was complete, 50,000 parts α,α-dimethylbenzyl hydroperoxide was added and the solution was heated in a constant temperature bath at 115° C. for 2½ hours. All but 13% of the hydroperoxide had reacted. The solution was, nevertheless, washed with 10% sodium carbonate to remove the catalyst, and excess alcohol was removed by heating at about 100° C. and 3 mm. pressure. To the residue was added 3 volumes of pentane and the solution was held at —10° C. to crystallize. The crystals obtained in the first crop amounted to 30,000 parts. These were bis(α,α-dimethylbenzyl) peroxide, melting point 36.1–36.4° C.

Example II

Example I was repeated using as the catalyst 0.4% aqueous (25%) sulfuric acid based on the α,α-dimethylbenzyl alcohol and approximately a 1-mole excess of α,α-dimethylbenzyl hydroperoxide. A temperature of 90° C. was used for the reaction. After 4½ hours 75% of the hydroperoxide had disappeared and 80% of the hydroperoxide was converted to bis(α,α-dimethylbenzyl) peroxide.

Example III

Example II was repeated using 0.2% boron trifluoride etherate as the catalyst based on the α,α-dimethylbenzyl alcohol. The yield of peroxide based on hydroperoxide was 76% of theory.

Example IV

A solution of 72,000 parts α,α-dimethyl-p-methylbenzyl alcohol and 35,000 parts α,α-dimethylbenzyl hydroperoxide containing dissolved therein 7 parts p-toluenesulfonic acid was heated for 2 hours at 90° C. All but 11% of the hydroperoxide had disappeared at the end of this time and the yield of crude α,α-dimethyl-p-methylbenzyl α,α-dimethylbenzyl peroxide based on hydroperoxide reacted was 68%. This product could not be crystallized in the usual manner.

*Example V*

A solution of 50,000 parts commercial 60% t-butyl hydroperoxide, 50,000 parts α,α-dimethylbenzyl alcohol and 10 parts p-toluenesulfonic acid monohydrate was heated at 90° C. for 7 hours. All of the hydroperoxide disappeared. The volatiles were removed at 70° C. and 1 mm. pressure. The residue was crystallized from pentane at −10° C. to obtain α,α-dimethylbenzyl t-butyl peroxide, melting point 15.5° C.

*Example VI*

A solution of 1000 parts α,α-dimethyl-p-methylbenzyl hydroperoxide and 2000 parts α,α-dimethyl-p-methylbenzyl alcohol containing dissolved therein 6 parts of p-toluenesulfonic acid monohydrate was heated at 80° C. for 3 hours. All of the hydroperoxide disappeared during this heating period. The resulting solution was washed with a 10% sodium carbonate solution and unreacted alcohol was distilled off at 1 mm. pressure. The residue was dissolved in 3 volumes of methanol and cooled to −10° C. to obtain bis(α,α-dimethyl-p-methylbenzyl) peroxide as a white crystalline material melting at 54° C. The yield was 80% of the theoretical.

The bis(α-arylalkyl) peroxides which are produced in the process of this invention are symmetrical or unsymmetrical peroxides of the formula

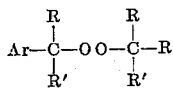

where Ar represents aryl groups or substituted aryl groups such as phenyl, naphthyl (α- or β-), Ar-tetrahydronaphthyl, tolyl, ethylphenyl and other alkyl-substituted phenyl groups, where R is a group which may be the same or different and represents aliphatic hydrocarbon radicals such as methyl, ethyl, propyl, butyl, etc., and where R' represents Ar or R. Since symmetrical or unsymmetrical peroxides are produced, R, R', and Ar may represent the same or different groups in each occurrence in the formula. Relative to the unsymmetrical peroxides of this invention, R' in the structural formula above is a radical of the group consisting of aliphatic radicals and aryl radicals which are different from the aryl radical Ar in the formula. Both the symmetrical and unsymmetrical peroxides are made by condensation of the corresponding hydroperoxides having the general formula

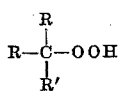

and alcohols having the general formula

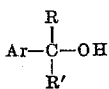

where Ar, R, and R' are the same as for the general formula for the peroxide above.

The hydroperoxides of the general formula

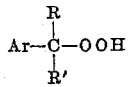

can be made by oxidation of an organic compound of the general formula

in which Ar, R, and R' represent the previously disclosed radicals. The process of oxidation is well known in the art and comprises essentially passing a gas containing free oxygen such as air through the organic hydrocarbon compound in the liquid state at, for example, about 70° C. to 90° C., preferably in the presence of a hydroperoxide stabilizer such as dilute alkali, until between about 5 and 50% hydroperoxide based on the hydrocarbon is formed. The hydroperoxide may be concentrated through removal by reduced pressure distillation of the unoxidized fraction and any low-boiling by-products, and may be separated for further purification by forming a crystalline complex with sodium hydroxide or an amine such as aniline which can be separated by filtration in a state of high purity. The hydroperoxide can then be liberated from the crystalline complex by shaking with the calculated amount of dilute mineral acid to combine with the alkali or amine. The α-arylalkyl hydroperoxide separates from the aqueous phase as a substantially pure oily hydroperoxide which may be washed again with water and be used directly in accordance with this invention for conversion to the peroxides by condensation with the arylalkyl alcohols.

The aryl alcohols useful in accordance with the process of this invention may be prepared by well-known methods and include α,α-dimethylbenzyl alcohol, α,α-dimethyl-p-methylbenzyl alcohol, α,α-diphenyl ethanol, and the like.

As a catalyst, any of the well-known acid-acting condensation catalysts may be used, such as the Friedel-Crafts type catalysts including boron trifluoride, complexes of boron trifluoride with ethers and organic acids, halides of metals whose hydroxides are amphoteric, such as aluminum chloride, zinc chloride, stannic chloride, titanium tetrachloride, etc., and mineral acid condensation catalysts, such as hydrofluoric acid, fluoboric acid, sulfuric acid, and phosphoric acid, and the organic sulfuric and sulfonic acids, such as the acid sulfate of the alcohol being condensed, or aromatic sulfonic acids including benzene, toluene, and naphthalene sulfonic acids.

The amount of catalyst used in this invention is critical in that too concentrated an acid medium will cause decomposition of the hydroperoxide. The maximum amount of catalyst that can be used with the aryl methyl hydroperoxides is based on the alcohol since an excess of alcohol will ordinarily diminish the activity of the catalyst toward decomposition of the hydroperoxide and provide sufficient concentration of alcohol that reaction of the hydroperoxide with the alcohol becomes the major reaction. On the basis that at least the theoretical amount and not more than a two-fold excess of alcohol will be present, the maximum amount of catalyst that will give satisfactory yields of peroxide as the major product is 0.5% based on the weight of the alcohol. The minimum amount will be an amount sufficient to catalyze the reaction, and that amount will vary with the activity of the catalyst. In the case of any of the acid-acting condensation catalysts, as little as 0.001% will be operable at a satisfactory rate of condensation.

As stated above, the amount of alcohol present in the condensation should be at least the theoretical calculated amount to combine with all of the hydroperoxide. An excess is preferred but more than three times theoretical or a twofold excess is objectionable, since a larger excess reduces the yield based on the alcohol due to losses of alcohol.

The temperature for the condensation must be at least 50° C. in view of the low catalyst concentration but must be kept below 120° C. because of a tendency for the aryl methyl hydroperoxides to pyrolyze rather than condense with the alcohol. The preferred temperature range for the minimum of side reactions is 70° C. to 100° C.

The symmetrical bis(α α-dialkyl-α-arylmethyl) peroxides produced by the process of this invention may also be produced in accordance with the copending application of Eugene J. Lorand and John E. Reese filed on even date herewith. The unsymmetrical peroxides made by the present invention have not heretofore been described and the present invention provides the first practical process for their production. The peroxides of the present invention find a number of commercial applications. Those peroxides of the general formula, in which Ar represents a phenyl or alkylated phenyl radical, have unusually good characteristics for use as catalysts in polymerization processes, halogenation reactions, etc., where high heat stability is desired. The bis(α,α-dialkyl-α-arylmethyl) peroxides are also useful in synthesis. They may, for example, be reduced by hydrogenolysis to the corresponding tertiary alcohols.

What I claim and desire to protect by Letters Patent is:

1. The method of preparing a peroxide of the formula

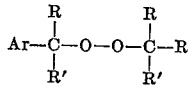

wherein Ar is an aryl radical, R is an aliphatic radical, and R' is a radical of the group consisting of aliphatic and aryl radicals differing from Ar, which comprises reacting a hydroperoxide of the formula

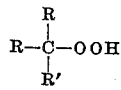

with at least the theoretical calculated amount but not exceeding a two-mole excess of an alcohol of the formula

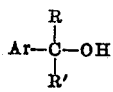

at 50–120° C. in the presence of a catalytic amount up to 0.5% of an acid-acting condensation catalyst based on the weight of the alcohol.

2. The process of claim 1 in which the alcohol is α,α-dimethylbenzyl alcohol and the hydroperoxide is α,α-dimethylbenzyl hydroperoxide.

3. The process of claim 1 in which the alcohol is α,α-dimethyl-p-methylbenzyl alcohol and the hydroperoxide is α,α-dimethylbenzyl hydroperoxide.

4. The process of claim 1 in which the alcohol is α,α-dimethylbenzyl alcohol and the hydroperoxide is t-butyl hydroperoxide.

5. The process of claim 1 in which the alcohol is α,α-dimethylbenzyl alcohol and the hydroperoxide is α,α-dimethyl-p-methylbenzyl hydroperoxide.

6. The process of claim 1 in which the condensation catalyst is an aryl sulfonic acid.

7. The process of claim 1 in which the condensation catalyst is p-toluenesulfonic acid.

8. The process of claim 1 in which the condensation catalyst is a boron trifluoride catalyst.

9. As a new composition of matter an unsymmetrical peroxide of the formula

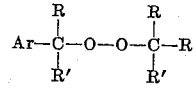

wherein Ar is an aryl radical, R is an aliphatic radical and R' is a radical of the group consisting of aliphatic radicals and aryl radicals differing from Ar.

10. As a new composition of matter, α,α-dimethylbenzyl t-butyl peroxide.

11. As a new composition of matter, α,α-dimethylbenzyl α,α-dimethyl-p-methylbenzyl peroxide.

HAROLD BOARDMAN.

References Cited in the file of this patent

UNITED STATES PATENTS

| Number | Name | Date |
| --- | --- | --- |
| 2,403,771 | Vaughn et al. | July 9, 1946 |
| 2,403,772 | Vaughn et al. | July 9, 1946 |
| 2,508,256 | Harman | May 16, 1950 |
| 2,522,016 | Denison et al. | Sept. 12, 1950 |
| 2,548,435 | Lorand et al. | Apr. 10, 1951 |

FOREIGN PATENTS

| Number | Country | Date |
| --- | --- | --- |
| 626,095 | Great Britain | July 8, 1949 |

OTHER REFERENCES

Karasch et al.: J. Org. Chem., 15, 753–762 (1950).